Patented June 17, 1930

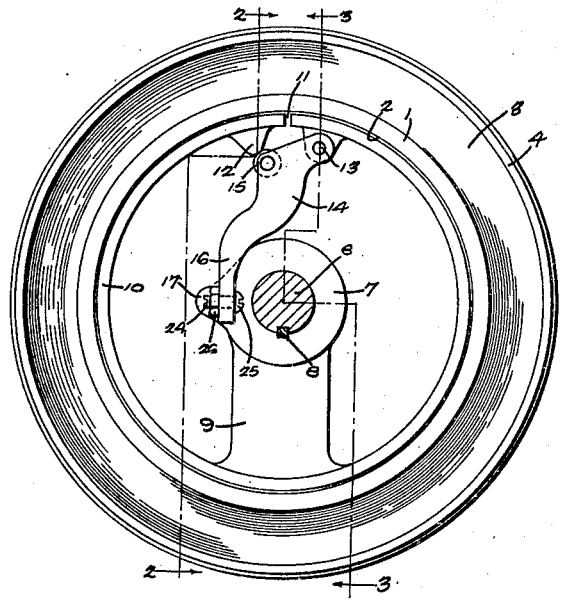
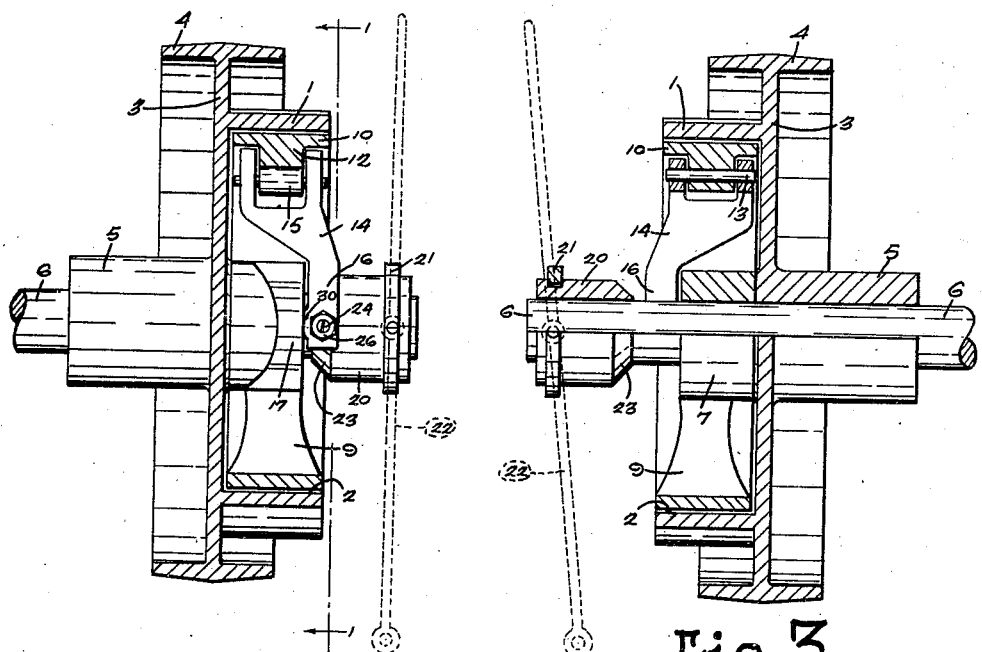

1,765,063

UNITED STATES PATENT OFFICE

CHARLES M. EBERLING, OF CLEVELAND, OHIO

CLUTCH

Application filed January 13, 1927. Serial No. 160,844.

This invention relates to clutches and has for its object the provision of a friction type of clutch for machinery which shall exhibit a maximum of simplicity, a minimum number of parts, a high degree of ruggedness and reliability, and a peculiar freedom from wear; the provision of a clutch whose members shall always engage each other uniformly and symmetrically; the provision of a clutch wherein wear is compensated by a single adjustment and without the necessity for the equal manipulation of different compensating devices; while further objects and advantages of the invention will become apparent as the description proceeds.

In the drawings accompanying and forming a part of this application I have illustrated a preferred physical embodiment of my inventive idea, although it will be understood that a great many different forms of the mechanism could be employed. Fig. 1 is a front view partly in section corresponding to the line 1—1 of Fig. 2; Figs. 2 and 3 are sectional views corresponding to the broken lines 2—2 and 3—3 respectively of Fig. 1 and looking in the direction of the arrows.

My improved clutch comprises a receiving member 1 whose interior surface 2 defines a surface of revolution, preferably a cylinder. This member 1 may be carried or supported in any suitable manner, in the present instance being carried by one face of the web 3 of the belt pulley 4 whose hub 5 runs loosely on the shaft 6. Inside this first member is a companion member comprising a hub 7 rigidly secured to the shaft by key and keyway 8 and having at one side a radial spoke or web 9 from which project circumferentially in opposite directions the two members of the flexible rim 10 whose external surfaces are concentric with the shaft 6 and lie closely adjacent to the surface 2. This rim is severed at the point 11, preferably at some distance from the spoke or web 9, and one end of said rim adjacent to the split is provided with a rigid abutment 12, while to the opposite end is pivoted by a pin 13 a lever 14 adapted to cooperate with the slanted or cammed surface of the abutment 12 to expand said rim into frictional engagement with the surface 2. Preferably one of these surfaces, such as that of the lever, is provided with a roller 15 to reduce friction and facilitate declutching.

The free end 16 of the lever is displaced laterally out of the plane of the rim to a point where it overhangs the face of the hub 7, and this face is preferably extended radially at this point as indicated at 17 making a kind of ear past which the free end of the lever moves.

Slidably mounted on the projecting end of the shaft 6 is a clutch spool 20 having journaled to its outer end a split ring 21 connected to the shifting lever 22 in the usual manner, and having a conical inner end 23 adapted when advanced to enter inside the end 16 of the lever and displace the same outwardly so as to expand the flexible rim 10 of the inner clutch member. In order to take up wear I have shown a set screw 24 carried by the free end of this lever and having a head 25 adapted to engage the clutch spool and a lock nut 26 by which its position can be fixed. The adjustment of this one screw is all that is required to compensate for wear, and both sides of the clutch always engage equally since the thrust of the lever is the same in both directions. No lubrication, no padding, and no prepared friction surfaces are necessary. The parts can be made of common cast iron and the external surface of the rim 10 caused to match the surface 2 with a minimum clearance necessary for convenient machine work such as for example 1/64 inch, after which the rim is severed at 11 by a saw scarf. It is advantageous at the same time to shift the center of the inner member slightly toward the point 11, in order to help compensate for the eccentricity caused by the expansion of the same by said lever. This is not imperative since a successful clutch can be made with the parts strictly in line but its adoption enables the clutch to carry a heavier load. The slant of the abutment 12 should be such as to cause the release of the clutch automatically upon the withdrawal of the spool 20 and without the use of disengaging springs.

By making the lever 14 of approximately the same weight as the web 9 any vibration due to irregularity in weight is avoided. The end of the lever 16 is best formed with a projection 30 adapted to slide over the face of the hub 7 and ear 17 thus withstanding the breaking or bending effect of the spool 20. The shaft 6 need project only a very short distance beyond the hub to accommodate the parts. The advance of this spool causes the pulley to be secured in driving relation to the shaft, but it will be understood that the respective clutch members may be applied to and used with any kind or design of machine elements and that a loose pulley has been selected solely as an illustrative example.

Having thus described my invention what I claim is:

In a clutch, in combination, a receiving member defining a surface of revolution, a shaft coaxial with said surface and rotatable relative to said member, a companion member having a split flexible rim inside of and complementary to said first surface, said companion member having a hub rigidly connected to said shaft and said rim being split at one point and having a rigid connection with said hub at a point removed from said split, a lever pivoted to said rim at one side of said split, the pivot axis being parallel to the shaft and the free end of the lever projecting past one side of said shaft, said lever and the opposite end of said rim being provided, one with a slant-faced abutment and the other with a roller adapted to engage said abutment in camming relation and expand the rim when the inner end of said lever is displaced outwardly, and to return said lever to disengaging position against the effect of centrifugal force when said lever is released, a longitudinally slidable spool mounted on said shaft, and a shifting member for said spool, said lever and spool having cooperating camming portions.

In testimony whereof I hereunto affix my signature.

CHARLES M. EBERLING.